April 27, 1937.    E. A. STULLER    2,078,643

END FASTENER

Filed Aug. 24, 1935

Inventor:
Earl A. Stuller
Attys.

Patented Apr. 27, 1937

2,078,643

UNITED STATES PATENT OFFICE 2,078,643

END FASTENER

Earl A. Stuller, Chicago, Ill., assignor to Western Chain Products Co., Chicago, Ill., a corporation of Illinois Application August 24, 1935, Serial No. 37,626

16 Claims. (Cl. 24—69)

The invention relates generally to devices for fastening chain and more particularly to a device for detachably connecting two ends of chain such as in the case of an automobile tire chain of the elongated type adapted to wrap around the entire circumference of a tire. When so used such devices may be termed "end fasteners".

The general object of the invention is to provide a fastener of this character which is easy to operate in connecting and disconnecting two ends of chain, which fastens the two ends together without danger of them accidentally becoming disconnected, and which is simple in construction and inexpensive to manufacture.

It is also an object to provide an end fastener which avoids the use of special links or parts on the respective ends of the chain to connect the latter to the fastener, and further permits the use of a chain composed of narrow links.

Another object is to provide an end fastener comprising two pivotally connected parts, in which the stress due to a pull on the respective ends of the chain is not sustained by the pivot connecting the parts or by a single part but rather is divided between and is sustained by the two parts conjointly.

Still another object resides in the provision of a simple form of locking member for locking the two parts of the fastener together, which member is carried by the chain.

A still further object is to provide a simple construction by which the fastener may be permanently secured to one of the end links of the chain.

Other objects and advantages will become apparent from the following description taken in connection with the accompanying drawing, in which.

A device embodying the features of the invention is designed to connect two ends of chain and to hold them against separation except when desired. The device is thus especially useful in the case of connecting the two ends of the side chain forming part of an automobile tire chain and extending around the side of the wheel for holding the cross chains in place. The device in its preferred embodiment is capable of use with a chain having relatively narrow links, which are generally considered to be the strongest type, and avoids the use of any special type of link or clevis on the ends of the chain.

Generally, the device in a preferred embodiment comprises a pair of relatively thin members pivotally connected to each other at one end and foldable from an extended position to a closed position in which the members are in face-to-face relation. The present device will be considered as constituting the end fastener of a tire chain. One end link of a side chain is preferably permanently secured to one of the fastener members at the end opposite its pivotal connection with the other member, and the other end link, or one near the other end, is engageable with the other fastener member at its end opposite the pivot so that, when the device is in its extended position, it may engage end links of the chain when they are a maximum distance apart. When the device is closed, the end links are drawn toward each other and are held at the opposite ends of the two fastener members. The pivotal connection is such that one member has a slight longitudinal play relative to the other so that the two may shift to distribute the pull on the chain between the two members and thereby relieve the pivot of the stress due thereto. To hold the two members in their closed or folded position, a locking element is provided for engagement with one of the members, which element is carried by the chain. The two members are preferably made of sheet-metal and the member which has one end link permanently secured thereto is shaped in a novel manner to receive the link and prevent its separation therefrom.

Figure 2:
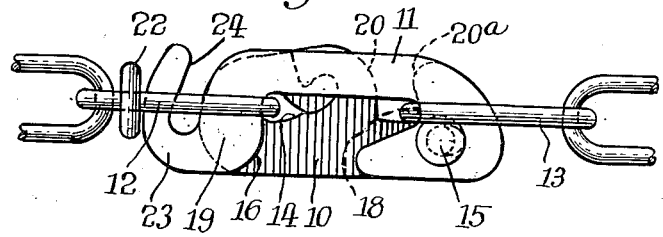
Fig. 2 is a view similar to Fig. 1 but showing the fastener in its closed but unlocked position.
Figure 3:
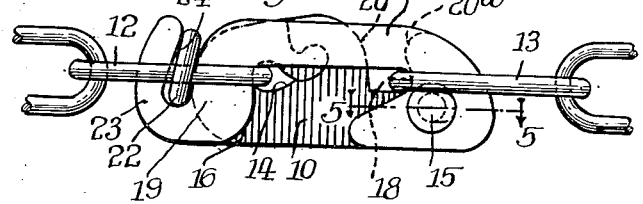
Fig. 3 is a view similar to Figs. 1 and 2 but showing the fastener in its closed and locked position.
Figure 4:
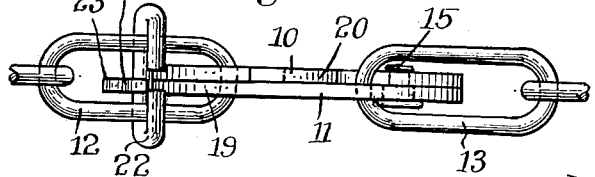
Fig. 4 is an edge view of the fastener in its closed and locked position.

As shown in the drawing, the preferred embodiment comprises a pair of members 10 and 11 for connecting two ends of chain such as the end links 12 and 13 of a tire chain. One of the members, in the present instance the member 10, is permanently secured to the end link 12, an aperture 14 being provided to receive the link, and the other member 11 is adapted detachably to engage the other end link 13 to draw the two links toward each other. To this end, the two members are connected by a pivot 15 so that they may be folded from an extended position as shown in Fig. 1 to a closed position where they are in face-to-face relation as shown in Figs. 2, 3 and 4.

The member 11, to receive the link 13, is provided with a notch 16 opening from the side edge of the member adjacent the end opposite the pivot 15. The notch 16 extends inwardly of the member transversely thence turns slightly toward said end, as at 17, so that the link 13 will not readily slip out, and then extends longitudinally in a reverse direction toward the pivoted end, as at 18. The notch thus forms a head 19 at the free end of the member 11. The notch is fairly wide at the edge of the member but is preferably of substantially less width than the distance between the ends 17 and 18 thereof.

Figure 1:
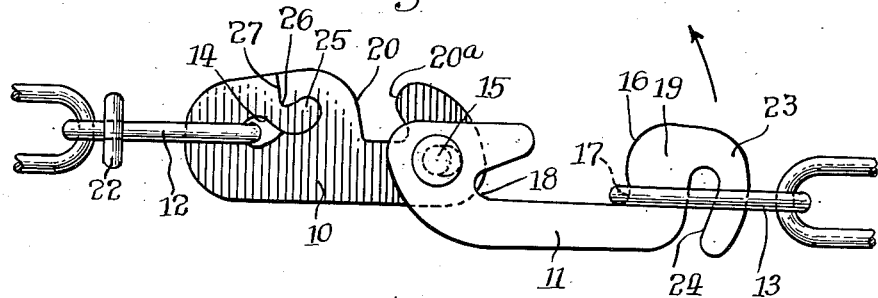
Figure 1 is a face view of a fastener embodying the features of the invention and showing the fastener in open or extended position.

To fold the members into a closed position, the member 11 is swung about the pivot 15 in the direction shown by the arrow in Fig. 1, so that the link 13 will be carried along with the member. As the member 11 swings, the link 13 slides in the notch 16 from the end 17 to the end 18. In the pivoted end of the member 10, a notch 20 is provided to receive the link 13 as the two members close, the notch 20 having a portion matching the end 18 of notch 16 and preferably slanting away from the pivot to hold the link firmly in the notch. At the edge of the member, the notch 20 is rounded as at 20a to cam the link 13 into the notch. The swinging movement of the member 11 also causes its end opposite the pivot 15 to move into the link 12 so that the latter is received in the notch 16 and is positioned in the end 17 of the notch when the members are fully closed. Thus, the notch in each member is closed by the other member. In other words, the link 13 is held in notch 20 in member 10 by the member 11, and both links 12 and 13 are held in the notch 16 of link 11 by the member 10.

One prominent feature of the invention is to so construct the members 10 and 11 that the links 12 and 13 will pull substantially equally on the two members. To this end, the distance between the respective ends 17 and 18 of the notch 16 is the same as the distance between the outer longitudinal ends of aperture 14 and notch 20. Thus, when the two members are closed and the ends 17 and 18 of notch 16 in member 11 are alined with aperture 14 and notch 20 in member 10, the pull of the chain will be distributed equally on the two members.

Figure 5:
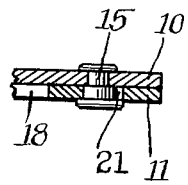
Fig. 5 is a fragmentary sectional view taken on the line 5—5 of Fig. 3.

To insure such alinement of the two members, they are allowed to shift longitudinally relative to each other to a slight extent. For this purpose, the hole in one of the members, in the present instance the member 11, is slightly elongated longitudinally of the member, as shown at 21 in Fig. 5, so that the pivot 15 has a loose fit therein and the members may shift relative to each other. This has the further function of relieving the pivot 15 of all stress due to the pull of the chain and dividing the entire pull evenly between the two members.

Another important feature of the invention resides in the provision of a locking means carried by the chain for holding the two members closed. As shown herein, said means comprises an element 22 carried by the end link 12 for engagement with the member 11. For this purpose, the head 19 of member 11 has a portion 23 extending beyond the end of the member 10 and within the link 12. The portion 23 has a notch 24 therein opening from the side edge oppositely to the notch 16 to receive the element 22. The latter preferably is in the form of a link mounted around and extending transversely of the end link 12 and is loosely retained thereon by the next link of the chain at one end and the member 10 at the other end.

After the two members are closed, the end link 12 is swung toward the opening of the notch 24, and the element 22 is then slid along the end link 12 and into the notch. The locking element 22 when in the notch 24 causes the end link 12 to tend to swing with the member 11. But, since the end link 12 is carried in the aperture 14 of member 10, opening movement of the member 11 is limited by the link 12. The locking element 22 therefore serves to hold the two members in a substantially closed position.

The two members 10 and 11 are preferably made of sheet metal punched to shape. By virtue of this fact, the members are relatively thin but strong, and when closed in face-to-face relation, they are of such thickness that they can enter a narrow chain link. Thus, the present device may be used with the strongest type of link, namely, the narrow link.

It is preferable that the device be permanently secured to one of the end links. In the present instance, the end link 12 is permanently secured to the member 10 by passing through the aperture 14 therein. Since the member 10 is made of sheet metal, novel means for securing the parts together may be provided. Thus, the member 10 is preformed with a slit or cut extending from the outer edge of the metal into the aperture and the parts expanded to permit the insertion of the link 12 after which the expanded parts are returned to their original position to secure the link in place. Preferably the edges of the metal formed by the slit are so shaped that they are prevented from being separated by movement in the plane of the member 10 and can be separated only by relative movement transversely of the plane of the member.

Figure 6:
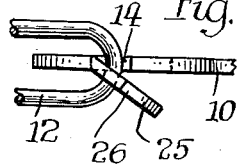
Fig. 6 is an edge view of a portion of the device to show the manner of securing one of the links of chain thereto.

As shown herein, the slit, indicated at 27, is so shaped that one edge has a lug 25 (see Fig. 1) and a narrower neck 26, while the opposite edge is complementally shaped to provide a recess or opening connected to the remainder of the slit by a narrowed neck. When the slit is made, the side having the lug 25 is bent out of the plane of the member 10, as shown in Fig. 6, sufficiently to permit the link 12 to be inserted into the aperture 14. Thereafter the lug 25 is bent back into the complemental recess and into a flat position. The lug 25, because of its enlarged head, thus will permit separation only by relative movement out of the plane of the member 10.

From the above description, it will be apparent that I have provided an end fastener which is easy to operate and simple and inexpensive to manufacture. The two members 10 and 11, being merely punched pieces of sheet metal, can be readily stamped out, and because of their thinness, may be used with narrow links without any special links or parts on the ends of the chain. The two members are pivotally connected to open and close and divide the pull of the chain equally between them without placing any of the stress on the pivot. When the two members are closed, they may be securely locked against accidental opening. The fastener may be permanently secured to one end of the chain in a simple but novel manner.

I claim as my invention:

1. An end fastener for connecting two ends of chain comprising a pair of flat, relatively thin members pivotally connected and overlying each other in face-to-face relation when closed, the respective members being notched from opposite edges when closed to receive the end links of the two ends of chain whereby the end links are retained in each member by the other member, the pivotal connection being loose to permit a slight endwise shifting of the members relative to each other whereby the pull of the end links will be substantially equalized between the two members.

2. An end fastener for connecting two ends of chain comprising a pair of flat members pivotally connected to lie in face-to-face relation when closed, said members being notched to receive the end links of the two ends of chain, the notches opening on opposite side edges of the respective members whereby the notches of the respective members are closed, the pivotal connection providing a slight longitudinal movement of one member relative to the other whereby the end links will pull substantially equally on the two members and stress on the pivotal connection is avoided.

3. A device for engaging spaced links of chain to be connected by a folding operation of the device and comprising a pair of foldable parts, both parts having edges against which the pull of the chain is exerted with the edges of the respective parts evenly spaced longitudinally, the parts being relatively shiftable after being folded together so that the stress is divided between the two parts.

4. A fastening device for connecting chain parts together and adapted to withstand a separating pull on the connected chain parts comprising, in combination, members connected together for closing movement into a position wherein the members are in substantially side by side abutment, said members when closed having spaced substantially alined transverse apertures therein to receive links of the chain parts, and means providing for relative shifting movement of said members to place the link engaged edges of said apertures in registration so that the strain of the separating pull is evenly divided between said members.

5. An end fastener for connecting two ends of chain comprising a pair of pivotally connected members foldable from an extended position to a closed position and engageable by the end links of chain and holding them in connected relation when closed, one of said members having a notch near its end opposite its pivotally connected end, and means carried by the chain and movable into engagement in said notch after the members have been folded into closed position to lock the two members in their closed position.

6. An end fastener for connecting two ends of chain comprising a pair of pivotally connected members foldable from an extended position to a closed position, said members being engageable by the end links of chain and holding them in connected relation when the members are closed, and a link carried by and entirely surrounding one of the end links slidably thereon and engageable with one of said members to lock the members in their closed position.

7. An end fastener for connecting two ends of chain comprising a pair of pivotally connected members foldable from an extended position to a closed position, the first of said members being shaped at one end to receive one of the end links of chain and the second member having a notch opening from one side edge and receiving said end link when the members are closed, said second member having a second notch opening from its opposite side edge, and an element carried by said end link and engageable in said second notch for locking the members in their closed position.

8. An end fastener for connecting two ends of chain comprising a pair of pivotally connected members foldable from an extended position to a closed position, one of said members having a notch opening from one side edge into which one end link enters when the members are closed thereby causing the opening movement of said member to be in the direction opposite to the notched edge thereof, and an element carried by said end link for engagement with said member for holding the said member against said opening movement.

9. An end fastener for connecting two ends of chain comprising a pair of pivotally connected members foldable from an extended position to a closed position in which the members lie in face-to-face relation, the first of said members having a notch opening from one side edge to receive one end link, the latter being carried by the second member, said first member having a portion extending beyond the end of the second member and having a notch opening from the opposite side edge thereof, and a link carried by said end link and movable into said notch when the members are closed to hold them in closed position.

10. In a fastening device for chain, a member adapted to be secured to a permanently closed end link of the chain comprising a flat sheet metal body having an aperture near one end thereof to receive the link, the body at one side of said aperture including a lug and a complementary recess to receive the lug, said lug having a shape to provide an enlarged head connected to the body by a narrowed neck and being engageable in said recess in the plane of the member, said lug being adapted to be bent out of said plane of the body to open a passage to said aperture for insertion of the link and then driven back into said recess after insertion of the link to hold the latter within the aperture.

11. In a fastening device for chain, a member adapted to be permanently secured to the end link of the chain comprising a flat sheet metal body having an aperture near one end to receive the end link, said body being separable along a line extending from the aperture outwardly to the edge of the body to provide for insertion of the end link and being shaped along said line to provide a lug with an enlarged head and a narrow neck on one side thereof and a complementally shaped socket on the other side of the line whereby insertion or removal of the end link can be effected only by movement of the lug transversely of the plane of the body out of said socket.

12. In a fastening device for chain, a flat relatively thin member having an aperture near one end to receive the end link of the chain, the member being separated along a line extending from the aperture to an outer edge thereof to provide for insertion of the link, and an interfitting lug and complemental recess therefor on opposite sides of said line to form an interconnection therealong for holding the aperture permanently closed.

13. In a fastening device for connecting two ends of chain, the combination of a flat metallic member arranged to be connected near one of its ends to one end of the chain, a second member coacting at one end with one face of the opposite end portion of said first member and being arranged near its free end to receive the opposite end of the chain, said second member being foldable into side-by-side relation with said first member for drawing the latter end of the chain into engagement with said one member and for holding the same in such engagement, said members having spaced substantially alined apertures therein for receiving the end links of the chain when in folded position, said second member having a longitudinally elongated hole in its first mentioned end portion, and a pivot secured on a fixed axis transversely in said opposite end portion of the first member and extending into said hole for permanently connecting the members together, said hole permitting endwise shifting of the second member relative to the first member to place the link engaged edges of said apertures in registration so that the strain of the separating pull of the chain is evenly divided between said members.

14. In a fastening device for connecting two ends of chain, the combination of a flat metallic member comprising a base on one side and having a recess opening toward its opposite side, said member being arranged to be connected near one of its ends to one end of the chain, a second member coacting at one of its ends with one face of the opposite end portion of said first member and having a recess opening toward the same side as said first mentioned recess when said second member is extended to receive the opposite end of the chain, said second member being foldable into side-by-side relation with said first member for drawing the latter end of the chain into engagement with said one member and for holding the same in such engagement, said second member having a longitudinally elongated hole in its first mentioned end portion, a pivot secured on a fixed axis transversely in said opposite end portion of the first member and extending into said hole for permanently connecting the members together but permitting relative endwise movement of said members to place the link engaged edges of said apertures in registration for evenly dividing separating pull of the chain between said members, said pivot being offset relative to a transverse longitudinal plane through said engaged edges toward the base of said first member to avoid passage thereover of the adjacent end link of the chain in the folding movement of said second member.

15. In combination in a fastening device of the character described, two flat members adapted to be folded into side-by-side relation and having complementally formed recesses in the edges thereof which are brought together in the folding movement of the members to engage therebetween the narrow end links of a chain, and a pivot connecting said members at the ends which adjoin when the members are in extended position, said pivot being located at that side of a transverse longitudinal plane through said members which is remote from the path of movement of the adjacent end link of the chain when the members are folded.

16. An end fastener for connecting two ends of chain comprising, in combination, a pair of pivotally connected members foldable from an extended position into a closed position, the first of said members having an aperture within which the link of one end of the chain is permanently connected, the second member being notched in its edge which is movable toward said first member for receiving the end link of the opposite end of the chain to draw the same into engagement with said first member, the end portion of said second member having a hook extension adapted to fit into said end link of said one end of the chain in the closed position of the members, and means carried by the latter end link engageable with said extension to hold the members in said closed position.

EARL A. STULLER.